United States Patent [19]

Wieszeck et al.

[11] Patent Number: 4,628,141
[45] Date of Patent: Dec. 9, 1986

[54] FLEXIBLE CONDUIT FIXTURING

[76] Inventors: James M. Wieszeck; Paul C. Wieszeck, both of Box 175, Salem, N.H. 03079

[21] Appl. No.: 737,782

[22] Filed: May 28, 1985

[51] Int. Cl.$^4$ .................. H01L 35/28; H01L 35/02
[52] U.S. Cl. ................................ 136/233; 136/221
[58] Field of Search ............ 136/201, 217, 230, 231, 136/232, 233, 224, 242, 221; 431/80; 338/28, 30; 374/139, 208; 29/573; 219/98

[56] References Cited

U.S. PATENT DOCUMENTS

| 3,468,723 | 9/1969 | Lambert | 136/221 |
| 3,477,122 | 11/1969 | Hamrick | 136/201 |
| 3,516,872 | 6/1970 | Klassen | 136/221 |
| 3,522,107 | 7/1970 | Kenyon | 136/217 |
| 3,650,843 | 3/1972 | Kenyon | 136/217 |
| 3,679,490 | 7/1972 | Finkbiner | 136/221 |
| 3,751,305 | 8/1973 | Huebscher | 136/221 |
| 3,930,891 | 1/1976 | Fox et al. | 136/217 |
| 3,930,892 | 1/1976 | Fox et al. | 136/217 |

Primary Examiner—John F. Terapane
Assistant Examiner—T. J. Wallen
Attorney, Agent, or Firm—Tilton, Fallon, Lungmus & Chestnut

[57] ABSTRACT

Flexible conduit fixturing, as for a thermocouple, where the coupling cap is spring equipped so as to lie between adjacent convolutions of the flexible conduit and be gripped thereby to prevent rotation of the flexible conduit.

5 Claims, 3 Drawing Figures

FLEXIBLE CONDUIT FIXTURING

BACKGROUND AND SUMMARY OF INVENTION

This invention relates to flexible conduit fixturing and, more particularly, to the substantial immobilization of flexible conduits such as are employed in thermocouples, fiber optic cables, heat transducers and the like.

Illustrative of the problem of fixturing is that of thermocouples. Now on the market are those constructed out of spiral wound stainless steel, flexible conduit onto which is screwed a threaded cap. The flexible conduit acts as a protective outer covering for the thermocouple element inside. It is used by inserting the flexible conduit into a hollow adapter and well or other well-providing means which has a ⅛" pin at a right angle to its top.

When the flexible conduit is pushed down and the cap is locked on the adapter or other receiving element, it acts as a spring to keep the thermocouple sensing tip at the end under tension. A serious problem arises in that the flexible conduit is free to turn inside the locking cap. In service, the thermocouple is locked onto the adapter which is often near or on the moving or reciprocating portion of a machine. The flexible conduit begins to work its way out of the cap causing the thermocouple tip (which is the sensing end) to lose tension with the surface completely. This leads to erroneous readings and worse, a runaway heating element.

One attempted solution to this problem is to provide a set screw in the cap but even this under heat, constant movement and the collapse of the thin stainless steel wall conduit under the set screw, eventually loosens.

The inventive fixturing solves this loosening problem in a different way. Instead of threading the cap as has been the past practice, a spring is fixed within the cap which fits inside the smaller loops of the stainless steel conduit. When the thermocouple is put into service by inserting it into the adapter and pushing down on the cap to capture it on the adapter pin, the spiral loops of the flexible conduit are compressed, closing on one another and capturing and locking the cap spring between them.

A search of the prior art relative to capequipped springs for thermocouples and like thin elements sheathed in flexible coupling revealed the following U.S. patents, none of which teach the concept of capturing a spring to immobilize the flexible conduit: U.S. Pat. Nos. 3,477,122, 3,522,107, 3,650,843, 3,679,490, 3,790,740, 3,751,305 and 3,930,891.

The invention is described in conjunction with an illustrative embodiment in the accompanying drawing, in which FIG. 1 is a fragmentary elevational view, partially in section, showing the invention as applied to a thermocouple;

DETAILED DESCRIPTION

Figure 1:
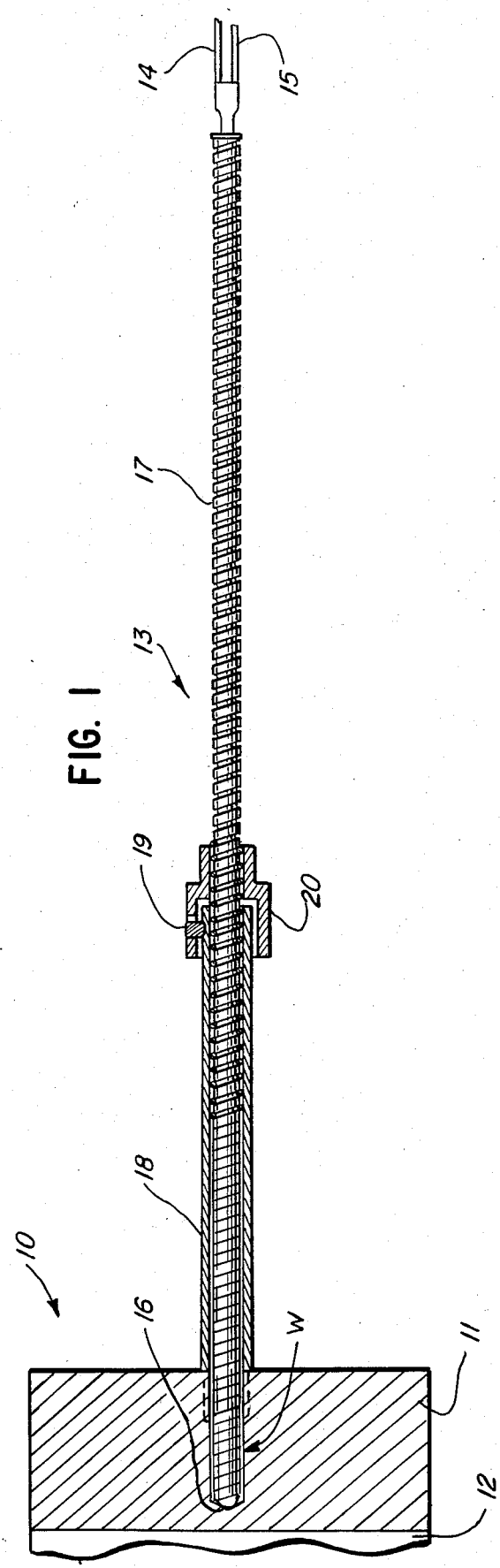

In the illustration given and with reference first to FIG. 1, the numeral 10 designates generally a machine portion whose temperature is to be sensed. For example, the numeral 11 designates a portion of the machine shell and the numeral 12 the interior which can contain material such as a hot plastic melt whose temperature is to be sensed and therefore controlled.

The numeral 13 designates generally the sensing portion of the thermocouple which includes wires 14 and 15. These are united at their sensing ends as at 16 and to the tip of the flexible conduit 17—usually by silver solder. The spirally arranged flexible conduit 17 is conventional for sheathing thin elements. The reporting ends of the wires 14 and 15 are connected, in conventional fashion, to a temperature reporting or controlling device (not shown).

Figure 2:
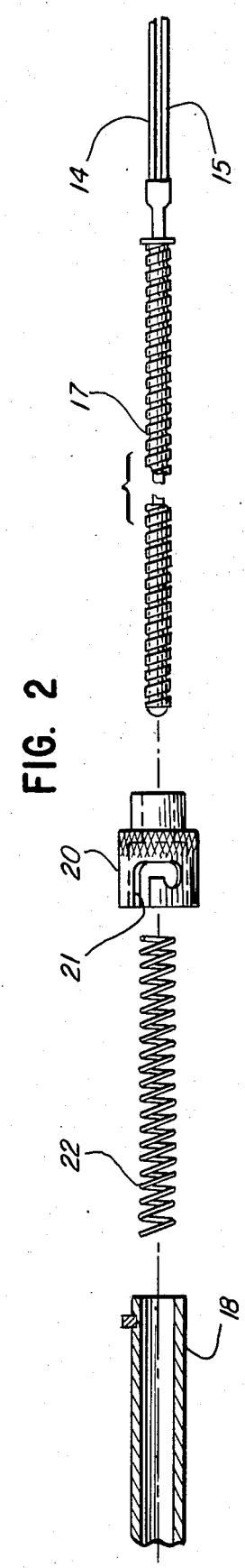
FIG. 2 is an exploded perspective view of the elements of FIG. 1.

Numeral 18 designates an adaptor and symbol W designates the well or cavity into which it is received in machine 10. The adaptor and well may take a variety of forms. For thermocouple or other thin element usage, this may be a columnar cavity, well or ensleeving element which is adapted to receive the sensing end of the flexible conduit and have thermal contact therewith. In accordance with conventional practice, the adapter adjacent its outer end, i.e., the end remote from the machine 10 is equipped with a ⅛" pin 19 serving to lock the cap 20 in place by virtue of a bayonet slot 21—see particularly FIG. 2.

In the past, the interior of the cap 20 was threaded to conform to the spiral grooves in the flexible conduit 17. The invention departs from this in providing a spring 22 which has spiral convolutions corresponding to the spiral spacing in the flexible conduit and which is fixed at one end within the cap 20. The fixing of the spring within the cap can be provided by soldering, boring and crimping, etc. In any event, the spring serves as a much greatly extended and advantageously superior means for capture within the spiral spacing of the flexible conduit when the same is compressed. We have found it advantageous to employ springs having loops of the order of 10 in number to be captured within the spiral grooving of the flexible conduit. A suitable spring for the specific illustration given is constructed of 0.030" diameter wire configured to the pitch of 0.091" to a length of one inch.

Another advantage to the invention stems from the fact that the flexible conduit is intended to be a non-rigid, bendable, protective housing for thin elements and is not designed to act as a spring as part of a device. The inventive use of a spring provides real spring pressure when it is compressed with the flexible conduit. It thus overcomes the deficiencies the flexible conduit has as a spring, as it relaxes more and more from the heat and continual movement to which it is subjected in the adapter. Further, the spring can conform to the flexible conduit in a manner not heretofore possible through the use of internal threads in the cap.

It will be appreciated that the invention is applicable to uses other than those for thermocouples. For example, it has advantageous application in the area of infrared thermometry and control where flexible conduit is often used as a protective housing for fiber optic cable. In fact, other applications such as communication where fiber optic cables are employed may be advantageously housed in flexible conduit to which the inventive fixturing is applicable. Additionally, the element housed within the flexible conduit may be a thermistor, RTD, semiconductor, or other heat transducer while still obtaining the advantages of the invention.

Figure 3:
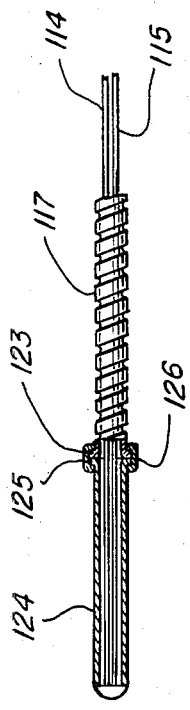
FIG. 3 is an enlarged fragmentary sectional view showing an improved coupling for the thermocouple tip.

The invention further contemplates an advantageous sensing end for the thermocouple/flexible cable and this is seen in an illustrated embodiment in FIG. 3. There, the sensing end of the flexible conduit 117 is equipped with a flange or ferrule as at 123. A closed-ended tubular member 124 is provided for the sensing end of the thermocouple wires 114 and 115 and this also is flanged or equipped with a ferrule as at 125. The ferrules 123 and 125 are confined in relative rotational form by means of a cylindrical clip 126.

Through this embodiment of the invention, there is provided an advantageous structure which avoids the tendency to break the thermocouple element. For example, there are often forces which develop on the thermocouple element directly behind the silver soldered tip. This occurs because the thermocouple element is fixed at both its ends. The sensing tip end is rigidly attached to the end of the flexible conduit by a bead of silver solder while the opposite end is fixed to a terminal block or has a plug connected to it which is inserted into a socket in the temperature reporting device (not shown).

When the thermocouple is inserted into the adapter and locked on, the jarring motion of the machine can cause a flexible conduit to twist inside the adapter. Because the thermocouple is rigidly fixed at both ends, the ends of the thermocouple at the tip must experience the rotational force of the flexible conduit. This leads to breakage of the thermocouple element over a period of time. This problem has been overcome through employment of the construction of FIG. 3 wherein the clip 126 is loose enough to allow the ferrules 123 and 125 to swivel relative to each other.

While in the foregoing specification a detailed description of the invention has been set down for the purpose of illustration, many variations in the details hereingiven may be made by those skilled in the art without departing from the spirit and scope of the invention.

We claim:

1. A thin wire temperature sensing device insertable in a cavity, said cavity having an element inserting end and a closed sensing end, a thin wire element sheathed in spirally convoluted flexible conduit adapted to be mounted in said cavity, and an open-ended, hollow cap adapted to be releasably lockably mounted on the cavity inserting end of said conduit, said cap having fixed therein a spiral spring having a plurality of convolutions interlaced with the convolutions of said conduit whereby constriction of said conduit upon locking of said cap grips said spring to immobilize said conduit relative to said cap.

2. The structure of claim 1 in which said spring has about 10 of said convolutions.

3. A temperature sensing device insertable in a hollow adapter and well having a bottom, said device having an element inserting end and a sensing end, a spirally convoluted flexible conduit sheathed sensing element insertably mounted in said adapter and well, and an open-ended, hollow cap releasably, lockably mounted on said adapter inserting end, said cap having fixed therein a spiral spring having a plurality of convolutions interlaced with the convolutions of said conduit whereby constriction of said conduit upon locking of said cap grips said spring to immobilize said conduit relative to said cap.

4. The structure of claim 3 in which said cap is bayonet-keyed to said adapter.

5. The structure of claim 3 in which said sensing ends include a rotatary joint.